Inventor:
MICHAEL MAUL

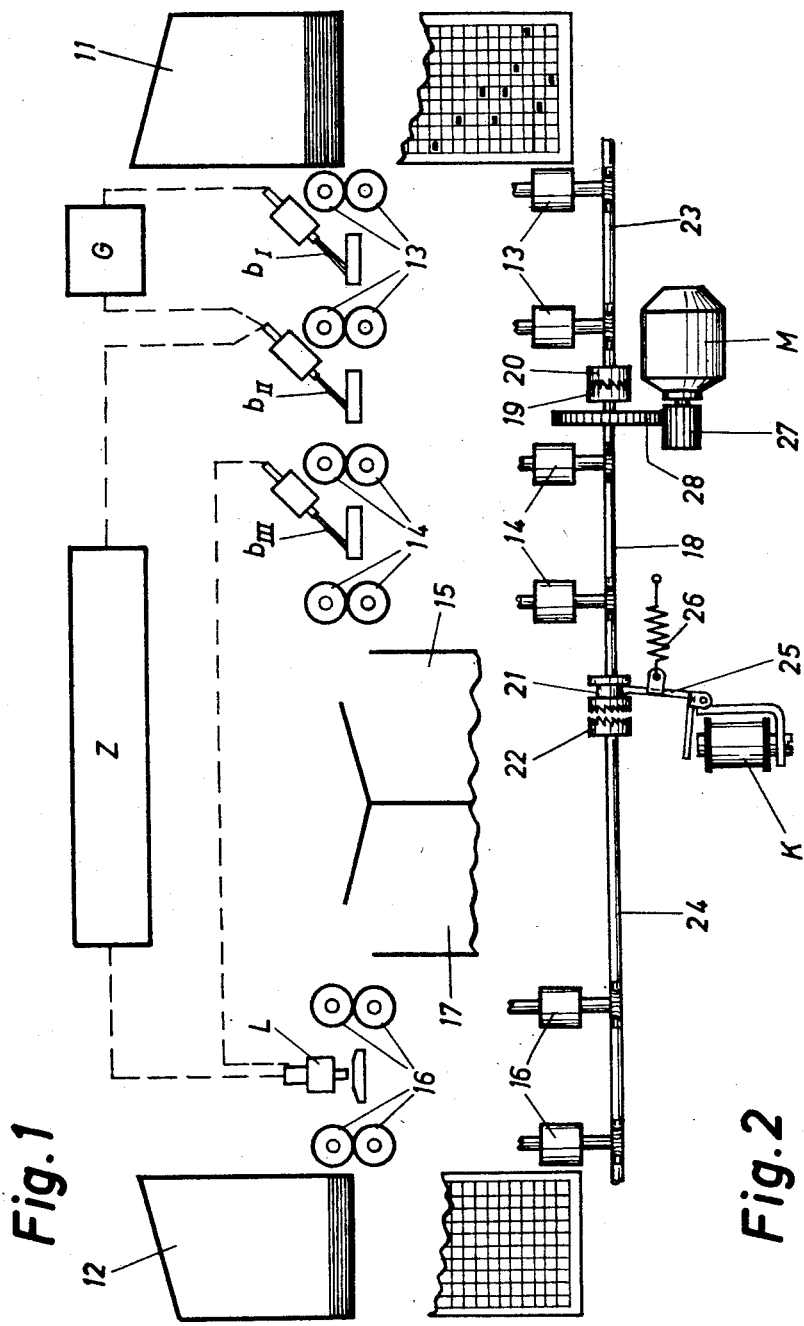

United States Patent Office

2,773,644
Patented Dec. 11, 1956

2,773,644
RECORD CARD CONTROLLED MACHINES HAVING GROUP CONTROL MECHANISM

Michael Maul, Schwabach, near Nurnberg, Germany

Application September 1, 1953, Serial No. 377,822

Claims priority, application Germany September 5, 1952

7 Claims. (Cl. 235—61.7)

In the art of record card controlled machines, it is one of the most important objects to compute the amount data of record cards and to record the total of such data. Each card indicates in addition to the amount data a group indication associated with said amount data and the cards are supplied to the recording machine in groupwise order. Upon group change, total recording is automatically initiated which is effected under the control of accumulators in which the amount data of the item cards had been entered. Group change can be indicated in various known ways but is usually indicated in more modern machines by a so-called automatic group control mechanism.

The foregoing manner of operation is usually applied to punched card controlled tabulating machines in which total recording is effected by printing upon a record sheet. Total recording can, however, also be effected by punching, for instance, by punching particular total cards in which instance, the machine is called a total card punch. In both instances, the machines are provided with means for detecting the group change which then causes the recording of the total of the data of the previously analyzed group of cards.

Now, for the recording of the total, it is, however, necessary to record also the associated designation data, which means the group data of the previously analyzed group of item cards. For this purpose, in known machines, the group data has been stored in a particular storing mechanism so that upon total recording, the group designation has been available. The entering of the group data into the storing mechanism has been effected from a card of the group of item cards. Preferably, the group number has been derived from the first card of the group and has been entered into the store which, after this single entering of the group data, has been disconnected from the further control by the group data of the subsequent cards of a group. It is, however, also possible to enter the group data into the store from the last card of a group. However, in all these instances for obtaining the group data upon total recording, a particular storing mechanism is required. This is particularly unfavorable if the group data does not consist of numerals but of letters such as, for instance, a name or the designation of materials. In this instance, each storing place associated with a column of a card must be provided with a number of setting possibilities corresponding to the number of numerals and letters. Due to this fact, the store may become very voluminous.

Now, according to the present invention, the group data is obtained upon total recording in a manner which avoids the use of a particular store for the group data by simply providing a further set of analyzers. According to the invention in the card feeding direction after the analyzers for the amount data, a set of analyzers is provided to which the last card of the group is supplied for deriving therefrom the group data and for recording the same together with the total.

According to a preferred embodiment of the invention, a total card punch is provided to punch into the total cards the total under the control of the accumulators and simultaneously the group data derived from the last card of the group. Preferably in this instance, the feed for the last card of the item card group is operatively connected with the feed for the item cards until response of the group control and is then, while the feed for the item cards is at rest, operatively connected with the feed for the total cards becoming operative upon group change.

In a machine in which the analyzers for the amount data analyze the index mark positions of each column one by one in a preferred embodiment, the set of analyzers deriving the group data from the last card of a group analyzes the index mark positions of each group data column also one by one. In a machine thus provided, it is then possible to cause punching of the total card on the one hand under accumulator control and on the other hand by the group data of the last card of a group by means of a single row of punches having one punch per column on which row the hole positions of the columns are passing one by one. The analysis of the group data from the last card of the group is therein effected synchronously with the passage of the total card on the row of punches. Such an arrangement leads to a comparatively small total card punch.

In the accompanying drawings a preferred embodiment of the invention is illustrated. The detection of the group change is effected by an electrical automatic group control mechanism but it will be obvious that any other known means for detection of the group change can be used. Generally known devices have been illustrated diagrammatically, since, for instance, accumulator control, group control devices, total accumulating and controlling of a punching mechanism by accumulators are known in various constructions.

Fig. 1 shows diagrammatically the construction of the machine in section from which the analyzing devices, punching device and the card feeding device may be seen.

Fig. 2 shows diagrammatically in plan the card feeding device as far as it is of importance with regard to the invention.

Figure 3:
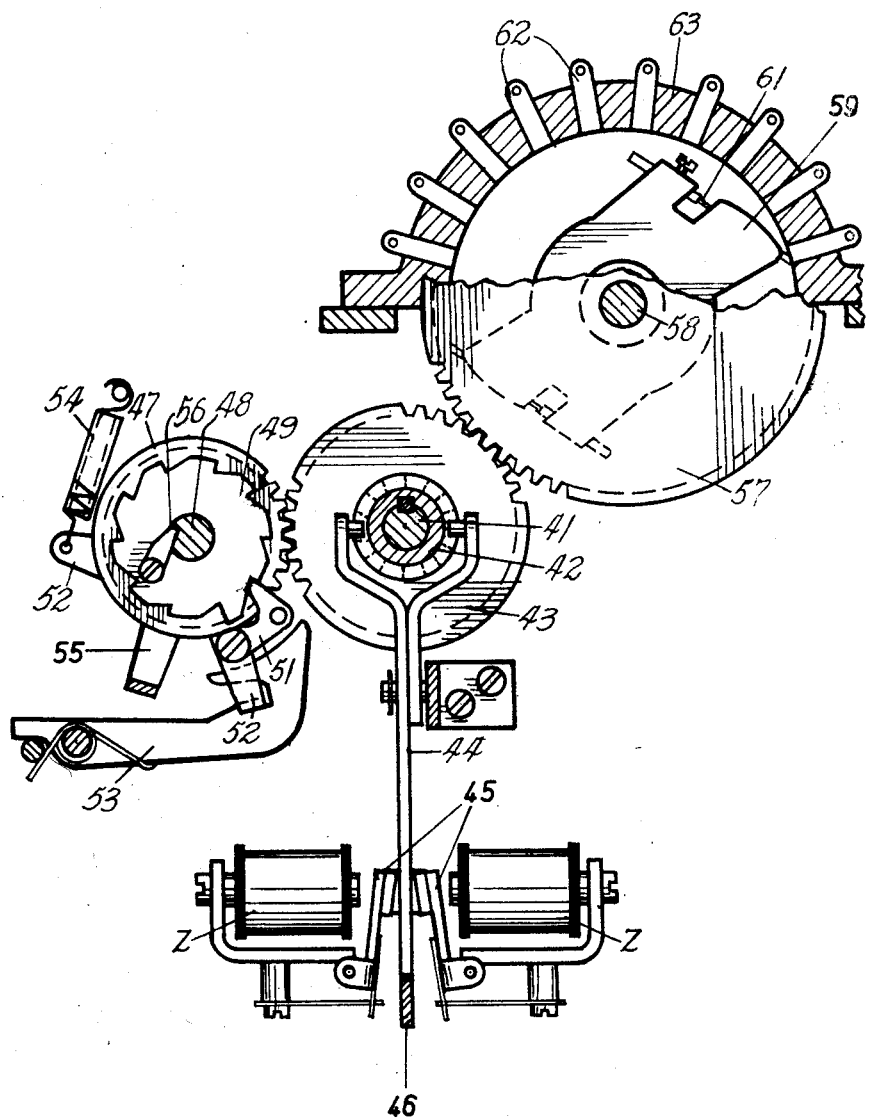
Fig. 3 shows a section through a known accumulator mechanism for totalling as used in the machine described herein.
Figure 4:
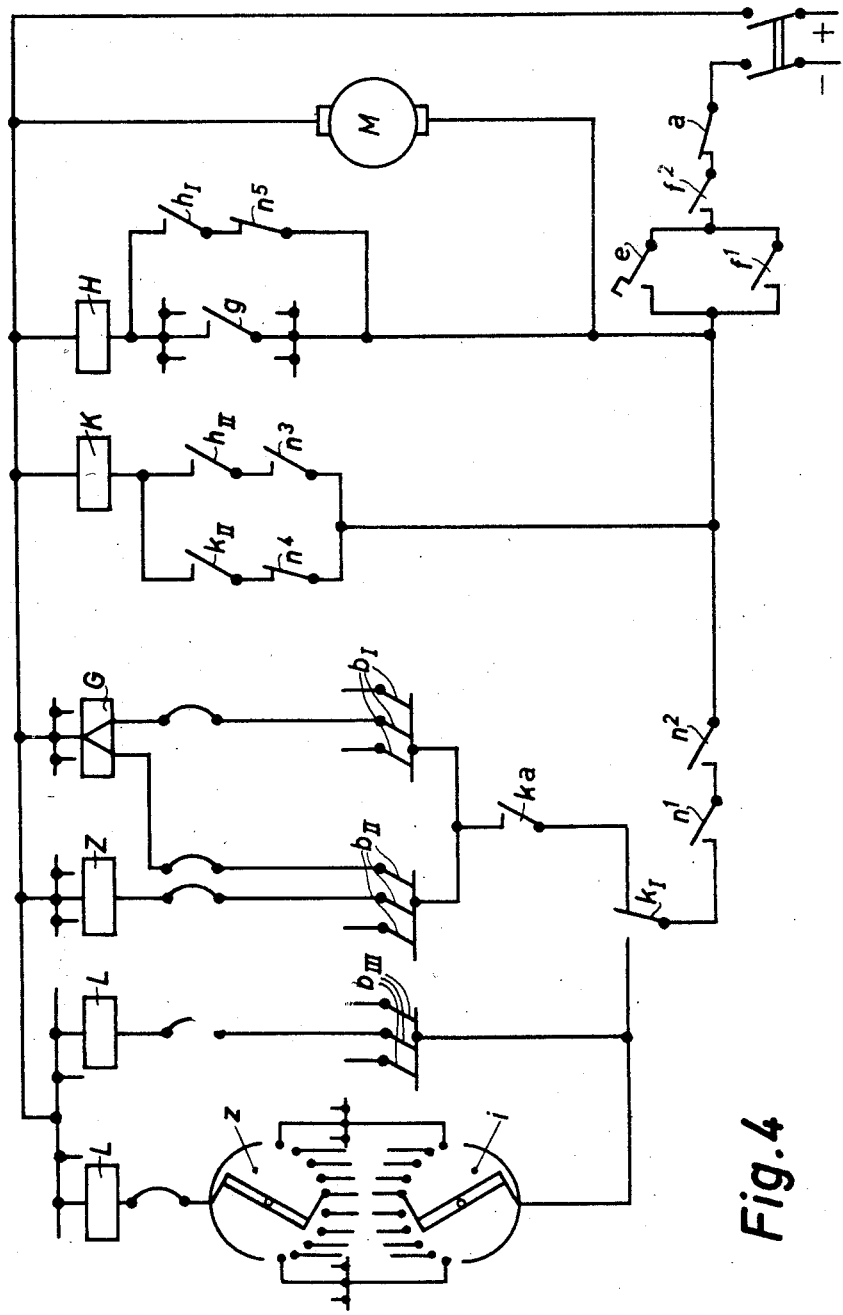
Fig. 4 shows the circuit diagram of the machine.

Before describing the machine in detail, the principle of the operation will be explained. The item cards are advanced from the item card magazine and pass two consecutive sets of analyzing brushes which compare the group numbers of consecutive cards. The brushes which analyze the group number columns are connected to the control device and the brushes of the second set of analyzers in the feeding direction which analyze the perforated values, control the accumulating mechanisms. If the group control device detects a group change the card feed from the card supply magazine will be stopped. The last card of the previously analyzed group has, however, already passed the value analyzers. After group change a summary card is advanced from the summary card magazine and is fed past a row of punches, said punches perforating the card according to the accumulator setting. Simultaneously with the passage of the summary card past the punching device the feeding device as far as it engages the last item card of the group is still kept operative and feeds the item card past a third set of brushes. The latter derives the group number from the last card and controls the respective punches of the punching mechanism while the summary card is passed under the punching device.

In detail the device according to the invention now operates as follows: The item cards, sorted according to groups, are inserted into the magazine 11 while in the magazine 12 blank cards are provided. The item cards are fed by the rollers 13 to the brushes $b_I$ and subsequently to the brushes $b_{II}$.

Between the brushes $b_I$ and $b_{II}$ there is provided the group control G which determines when a group of item cards has passed through and when the total must be taken. From the brushes $b_{II}$ also the respective items of the card are entered into the accumulators.

When entering into the accumulator is finished the card is fed by the feed rollers 14 to the brushes $b_{III}$ and subsequently to the receiving pocket 15. Constant data, such as group number, name and the like are directly transferred by the brush $b_{III}$ to the punching device L. The brushes $b_{III}$ do not become effective upon each item card but only upon the last one, during the analysis of which, by the brushes $b_{III}$, punching of the total is simultaneously effected by the punching device L. Accordingly, upon total taking the accumulator setting as well as the constant data are simultaneously transferred to the blank card by the punching device. The summary cards are fed by the feed rollers 16 to the punching device L and subsequently to the receiving pocket 17.

In accordance with the various card movements the various feed rollers must be differently driven, namely in such a way that the feed rollers 13 run only as long as item cards are being analyzed and entries are being transferred to the accumulators. If the group control responds the feed rollers 13 are disengaged from the drive and the feed rollers 16 for the summary card engage the drive. On the other hand, however, the feed rollers 14 should not be influenced by this change-over as they must be engaged in the first instance so that the item cards may be further fed to the receiving pocket, and since they must also be engaged in the second instance in order to pass the last item card of a group under the brushes $b_{III}$ so that the respective entries may be transferred to the punching device. Accordingly, the last item card of a group is further advanced while the following item cards of the next group are at rest. Synchronously with the movement of the last item card under the brushes $b_{III}$ the summary card moves past the punching device L.

The feed rollers 14 are permanently connected to the drive from the motor M, as may be seen from Fig. 2. The motor M drives the gear 28 by means of the pinion 27, said gear being fast upon the shaft 18. Moreover, worms are firmly mounted on the shaft 18 and drive the feed rollers 14 through worm wheels. Upon the shaft 18 there are also fast the dog clutches 19 and 21. When the clutch magnet K becomes deenergised the dog clutch 19 engages the dog clutch 20 by means of the spring 26 and armature 25, and thereby the shaft 23 is brought into driving connection with the shaft 18. Upon the shaft 23 there are also worms which drive, through worm wheels, the feed rollers 13. Now, when the clutch magnet K is energized, it attracts its armature 25, the latter thereby engaging the two dog clutches 21 and 22, displacing the shaft 18 and disengaging the dog clutch 19 from the dog clutch 20. The shaft 24 is now brought into driving connection with the shaft 18. Upon the shaft 24 there are also provided worms which drive the feed rollers 16 through worm wheels.

As may be seen from the diagram of the drive, the feed rollers 14 are permanently rotating while, through the clutch magnet K selectively either the feed rollers 13 or the feed rollers 16 are connected for operation. Normally, the feed rollers 13 are connected for operation. Now, if total taking is to take place, the clutch magnet K is energized and therewith the feed rollers 13 are disengaged and the feed rollers 16 which feed the summary card are engaged. The control of the clutch magnet K in dependence on the group control and the total taking will be referred to later on in the description of the wiring diagram.

For reasons of clearness an accumulator of the known type will be briefly described here, of a form which may be used for the machine described herein. It is an accumulator as used in a similar manner, for instance in the known Hollerith machines. The shaft 41 rotates always uniformly in the clockwise direction synchronously with the card movement. On the shaft 41 the clutches 42 are mounted for axial movement while being held against rotation relative to the shaft. The clutches 42 are held disengaged from the gear 43 by the levers 44, said gear being loosely and rotatably mounted upon the shaft 41 but held against axial movement thereon. If one of the magnets Z is energized it attracts its armature 45, thereby releasing the blocking of the lever 44 and causing the clutch 42 to be pressed by a spring against the gear 43. Energization of the magnet Z depends upon whether the associated brush $b_{II}$ encounters a hole in the card and thereby closes the circuit through the magnet. When the analysis of the card is finished all released levers 44 are again restored to their home position by means of the bar 46 and thereupon the clutches are disengaged.

The rotating movement of the gear 43, thus effected, is transferred to the gear 47 and the gear 57. The gear 47 is connected to the ratchet wheel 49 and is rotatably mounted upon the shaft 48. Ratchet wheel 49, pawl 51, lever 52, 53, spring 54 and yoke 55 serve in a known manner for the tens transfer and for zeroising. If the accumulator is to be zeroised, the shaft 48 is rotated once in the counter-clockwise direction. In the shaft there is provided a recess into which the pawl 56 drops according to the setting of the associated denominational accumulator element, thereby taking the latter to the zero position.

Upon the gear 57 there is provided the insulating body 59 which holds the brush 61. According to the accumulator setting the said brush slides over a commutator 63 having the contact lamellae 62. The opposite brush 61 slides always over a contact path which is not illustrated in detail herein. According to the setting of the accumulator element the brush 61 is set to any one of the contact lamellae 62 thereby permitting reading of the accumulator setting, as will be described later on.

*Wiring*

In the illustration of the wiring for the summary punch a simplified method has been chosen, as generally used in the art of communication.

If the two supply magazines are filled with cards, the associated known magazine contacts $f^1$ and $f^2$ are closed. If the machine is now switched on the motor M receives current through the contacts $a$, $f^2$, $f^1$. The machine starts running and feeds the first item card to the brushes $b_I$. When the first card reaches the brushes $b_I$ the cam contact $n^2$ closes as long as the hole positions are passing under the analyzing means. Simultaneously therewith also the card lever contact $ka$ closes. The cam contact $n^1$ closes temporarily when the first hole position is under the analyzing device. Now, current flows from the contact $f^1$ through the contacts $n^2$, $n^1$, $k_I$, $ka$ through the brush $b_I$ passed through a hole, the right hand winding of the group control relay G to positive. Simultaneously, current flows also from the card lever contact $ka$ through the brushes $b_{II}$, through the left hand winding of the group control relay G to positive. The group control relays are constructed as differential relays and they respond if current flows only through one of the two windings.

Since there is not yet a card under the brushes $b_{II}$, current can flow through all brushes $b_{II}$ while the circuits through some of the brushes $b_I$ is interrupted by the first item card. Accordingly, current does not flow through all windings of the group control relays so that one or a plurality of said relays respond and close their contacts $g$. Thereby the relay H receives current and responds, thus closing its two contacts $h_I$ and $h_{II}$.

A holding circuit is established to the cam contact $n^5$ by the closure of the contact $h_I$, so that the relay H remains energized even when the contacts g return to their home position. This energization is also maintained, independently of the analysis of the following hole position. Due to the closure of contact $h_{II}$ the current circuit for the clutch magnet K is prepared.

Before the card is advanced to bring the second hole position under the row of brushes $b_I$ the cam contact $n^1$ opens. It is accordingly the purpose of the contact $n^1$ to interrupt the circuit through the brushes before the latter are again lifted by the card. By these means sparking at the brushes is avoided. On analysis of the next position the contact $n^1$ closes again temporarily. For each hole position these cycles will be repeated. When all the positions have passed under the brushes $b_I$ the cam contact $n^3$ closes temporarily (only once per card analysis) thereby establishing the circuit to the clutch magnet K through the closed contact $h_{II}$. The latter responds, disconnects the item card feed and engages the summary card feed. Due to the responding of the clutch magnet K its contact $k_I$ is shifted and the contact $k_{II}$ is closed. Upon shifting of the contact $k_I$ the circuit to the brushes $b_I$ and $b_{II}$ is interrupted and is established to the brushes $b_{III}$ and to the analyzing device of the accumulators. However, for the time being this does not yet have any influence upon the operation of the machine, since in the accumulator no items have been computed so far. Due to the closure of the contact $k_{II}$ a holding circuit is established to the clutch magnet K through the cam contact $n^4$.

The first summary card is now fed to the punching device. However, shortly before the first summary card reaches the punching device the cam contact $n^4$ is temporarily opened, thereby interrupting the holding circuit to the clutch magnet K so that the latter becomes deenergised and its contacts $k_I$ and $k_{II}$ return to their home position. Simultaneously therewith the item card feed is started and the summary card feed is stopped again. During the feed of the summary cards also the cam contact $n^5$ which is controlled in dependence of the shaft 24 has temporarily opened, thereby interrupting the holding circuit for the relay H and causing the same to become deenergised.

The first item card is now fed to the analyzing brushes $b_{II}$. Simultaneously the second item card is fed to the analyzing brushes $b_I$. If both item cards have the same group number, current will always flow simultaneously through both windings of the group control relays upon the subsequent analysis of both cards, so that the group control relays cannot respond. Moreover, the accumulator magnets Z are controlled by the brushes $b_{II}$.

The analyzing cycles and the entering into the accumulators is continued until group change is detected. In this instance, the last item card of the previously analyzed group is under the brushes $b_{II}$. The card now following belongs to the next group. Now, one or a plurality of the group control relays will respond. The latter close their contacts g which in turn close the circuits to the relay H, as has been described above. At the end of this analyzing cycle the clutch magnet K is energized, as has been described above, and therewith the total taking operation is initiated. The card feed for the item cards is thereby stopped and the summary card feed is started instead. Due to the responding of the magnet K the contact $k_I$ is shifted. During the following card cycle the last item card of the group is now moved past the rollers 14 under the brushes $b_{III}$. Simultaneously, also the summary card moves past the punching device so that by means of the brushes $b_{III}$ designation data of the last item card can be transferred to the punching device L.

Simultaneously therewith a known impulse emitter is also rotating synchronously with the card movement, said emitter being used in Hollerith machines for the analysis of the accumulators. The same is common to all accumulator places. Depending on the various settings of the various accumulator places Z, a time differential current impulse is sent through the associated punching magnet L which is energized and presses the punch through the card in the respective position of the corresponding column. As has been mentioned above, there is provided for each column only a single punch with an associated punching magnet L. The advance of the summary card is preferably effected step by step, for instance by inserting a Maltese drive between the shaft 24 and the rollers 16.

At the end of the total punching the accumulators are reset and the machine is again adjusted for item card feed, as has been mentioned above. The contacts $f^1$ and $f^2$ are provided under the supply magazines and they are closed as long as there are cards in the same. If there are no cards in a magazine the associated contact will open and interrupt the circuit through the whole machine. This is also the purpose of the contact a, which opens as soon as one of the two receiving pockets 15, 17 is filled with cards.

I claim:

1. In a record card controlled machine, means for feeding said cards along a feeding path, analyzing means on said feeding path for analyzing amount data fields of said record cards, accumulating means under the control of said amount data analyzing means, means in said feeding path for detecting a change in the groups of cards, recording means automatically set under the control of said accumulating means by said detecting means upon a group change for recording the setting of said accumulating means, designation data analyzing means arranged in said feeding path behind said amount data analyzing means to control said recording means, feed control means controlled by said detecting means for interrupting the card feed past said amount data analyzing means and to feed the last card of the group to said designation data analyzing means, and means for controlling the recording means by said designation data analyzing means concurrently with the control of said recording means by said accumulating means.

2. A recording machine controlled by perforated cards, comprising means for feeding cards along a feeding path, analyzing means on said feeding path for analyzing amount data fields of said cards, accumulating means under the control of said amount data analyzing means, means in said feeding path for detecting a change in the groups of cards, punching means automatically set under the control of said accumulating means by said detecting means upon a group change for punching the setting of said accumulating means, designation data analyzing means arranged in said feeding path behind said amount data analyzing means to control said punching means, feed control means controlled by said detecting means for interrupting the card feed past said amount data analyzing means and to feed the last card of the group to said designation data analyzing means, and means for controlling the punching means by said designation data analyzing means concurrently with the control of said punching means by said accumulating means.

3. A punch card controlled machine according to claim 2, wherein the means for punching the summary cards comprises a single row of punches past which the hole-positions of the columns of cards are fed one by one, and means whereby the analysis of the group data of the last card of the group is effected synchronously with the passage of the summary card past the row of punches.

4. A punch card controlled machine according to claim 3, wherein the punching of the summary cards occurs on one hand, under the control of the accumulating means, and on the other hand, by means of the group indications of the last card of a group made by the single row of punches, and the sensing of the group-indication from the last card of the group is synchronous with the passage of the summary card.

5. In a record card controlled machine, means for feeding record cards along a feeding path, analyzing means on said feeding path for analyzing amount data fields of said record cards, accumulating means under the control of said amount data analyzing means, a group control mechanism including analyzing means in said feeding path and responsive upon a group change in the designation data of subsequent cards, recording means automatically set under the control of said accumulating means by said group control mechanism upon a group change for recording the setting of said accumulating means, further designation data analyzing means arranged in said feeding path behind said amount data and designation data analyzing means to control said recording means, feed control means controlled by said group control mechanism for interrupting upon group change the card feed past said amount data and group control analyzing means and to feed the last card of the group to said further designation data analyzing means, and means for controlling the recording means by said further designation data analyzing means concurrently with the control of said recording means by said accumulating means.

6. A recording machine controlled by perforated cards, comprising means for feeding cards along a feeding path, analyzing means on said feeding path for analyzing amount data fields of said cards, accumulating means under the control of said amount data analyzing means, a group control mechanism including analyzing means in said feeding path and responsive upon a group change in the designation data of subsequent cards, punching means automatically set under the control of said accumulating means by said group control mechanism upon a group change for punching the setting of said accumulating means, further designation data analyzing means arranged in said feeding path behind said amount data and designation data analyzing means to control said punching means, feed control means controlled by said group control mechanism for interrupting upon group change the card feed past said amount data and group control analyzing means and to feed the last card of the group to said further designation data analyzing means, and means for controlling the punching means by said further designation data analyzing means concurrently with the control of said punching means by said accumulating means.

7. A machine as set forth in claim 6, wherein the analyzing means comprise three rows of brushes associated with the item card portion of the card feeding means and the single row of punches is associated with the total card feeding means.

References Cited in the file of this patent

UNITED STATES PATENTS 2,493,858    Carroll et al. _____ Jan. 10, 1950